United States Patent [19]
Murtezov et al.

[11] 4,143,530
[45] Mar. 13, 1979

[54] LOCKABLE GAS CAP ASSEMBLIES

[75] Inventors: Sezhaidin M. Murtezov; Dzhihan S. Murtezov, both of Sevlievo, Bulgaria

[73] Assignee: NOP "Technologia Na Metalite", Sofia, Bulgaria

[21] Appl. No.: 760,987

[22] Filed: Jan. 21, 1977

[30] Foreign Application Priority Data

Jan. 20, 1976 [BG] Bulgaria ................................. 32114

[51] Int. Cl.² ............................................. B65D 55/14
[52] U.S. Cl. ..................................... 70/165; 70/363; 220/210
[58] Field of Search ................. 70/163, 164, 165, 170, 70/171, 172, 173, 363; 220/210

[56] References Cited

U.S. PATENT DOCUMENTS

| | | | |
|---|---|---|---|
| 1,624,840 | 4/1927 | Malluk | 70/172 X |
| 1,649,587 | 11/1927 | Halaby | 70/165 |
| 1,783,971 | 12/1930 | Miquet | 70/173 X |
| 1,891,214 | 12/1932 | Falk | 70/363 X |
| 1,928,879 | 10/1933 | Causey | 70/172 |
| 2,138,871 | 12/1938 | Malluk | 220/210 X |
| 2,565,166 | 8/1951 | Bolduc | 70/165 |
| 2,588,230 | 3/1952 | George | 70/363 |
| 3,142,167 | 7/1964 | Christopher | 70/363 X |
| 3,998,078 | 12/1976 | Detwiler | 70/171 |
| 4,000,632 | 1/1977 | Summan | 70/165 |

FOREIGN PATENT DOCUMENTS

757683 10/1933 France ....................................... 70/165

*Primary Examiner*—Thomas J. Holko

[57] ABSTRACT

A lockable gas cap assembly includes an inner hollow shell adapted to be threadedly connected to the filler tube of a vehicle gas tank and an outer shell which coaxially surrounds the inner shell for removably retaining it for normal relative rotation with respect thereto. A two-part, key-operated locking member is likewise releasably secured within the outer sleeve, a front hollow portion of the locking member exhibiting a radial slot that is aligned with an inwardly cusped periphery of an aperture in the inner sleeve when such inner sleeve is likewise retained within the outer sleeve. A rear tumbler portion of the locking member has a forward projection with a recess or flat thereon, the recess being moved into registration with the slot in the hollow body when the key is operated. A follower member slidably carried in the radial slot is engaged with the unrecessed portion of the periphery of the tumbler projection when the key is operated, so that the outer end of such follower engages the cusped surface of the overlying inner sleeve. The restraining effect of the cusp on the follower effectively locks the inner and outer sleeves together for joint rotation. As a result, manual rotation of the outer sleeve will cause the gas cap assembly to be unscrewed from the gas tank filler pipe.

4 Claims, 9 Drawing Figures

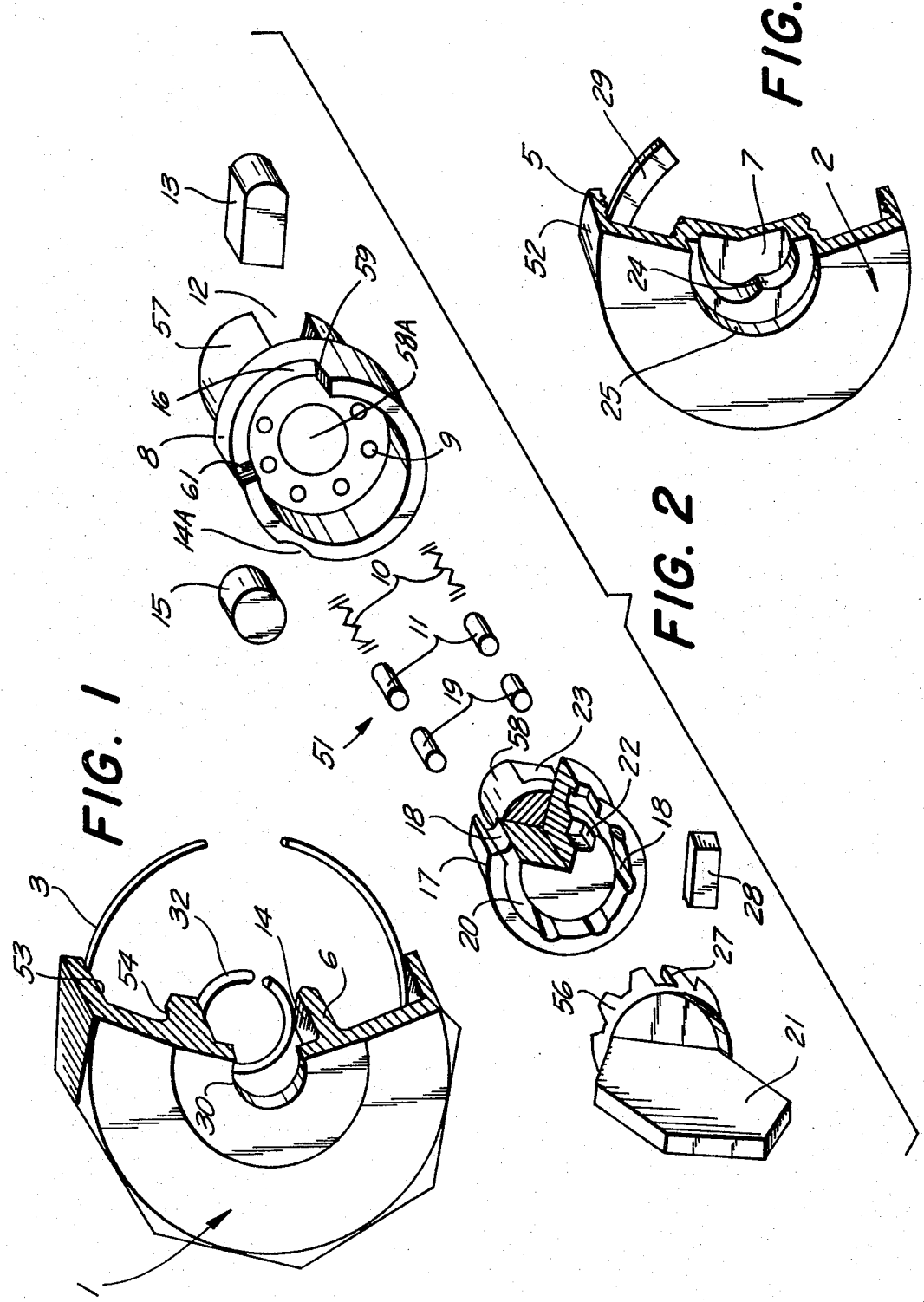

LOCKABLE GAS CAP ASSEMBLIES

BACKGROUND OF THE INVENTION

The invention relates to lockable lids or covers adapted to be threadedly engaged on the outer end of a filler tube associated with a vehicle gas cap.

In known designs of this type, an inner hollow shell has a threaded front portion for engagement with the filler tube. Such inner shell is received within, and is normally coaxially rotatable with respect to, an outer shell. A key-operated cylindrical tumbler is arranged between the inner and outer shells, and is provided with facilities for coupling the inner and outer shells for joint rotation when the key is operated. At such time, a manual rotation of the outer shell will cause the cap assembly to be unscrewed from the filler tube.

In general, the key-operated cylindrical portion is sealed within the outer shell, while the selective coupling between the inner and outer shells is effected by means of a pin or axle also secured to the outer shell and adapted to fit within a circular aperture of the inner shell.

Such existing designs have been found to be relatively clumsy and unreliable, as well as difficult to physically remove from the filler cap when the key is operated.

SUMMARY OF THE INVENTION

Such disadvantages are overcome with the improved lockable gas cap construction of the present invention. In an illustrative embodiment, a two-part, key-operated cylindrical tumbler is releasably retained within the outer shell, and includes a forward hollow portion with a radial slot that cooperates with a recessed forward projection on the rear or tumbler portion. When the key is operated, the unrecessed portion of the periphery of the front tumbler portion comes into registration with the radial slot on the hollow body, and serves to cam a movable follower member outwardly through the slot to engage an inwardly cusped portion of a peripheral wall of an aperture in the overlying inner shell, which is likewise removably secured to the outer shell.

In operated outer position the follower engages the cusped surface of the inner sleeve, the cusp prevents further rotation of the follower and thus effectively locks the inner and outer shells together for joint rotation. When the key is again moved into the inoperative position, the recessed area on the tumbler projection is again in alignment with the slot, so that a further rotation of the outer sleeve will cause the cusp to cam the follower inwardly through the slot and to thereby decouple the inner and outer sleeves.

In one feature of the invention, the rear of the tumbler exhibits channels that receive corresponding projections in the front of the key member. An axial slot is formed between a pair of adjacent projections on the key, such axial slot being engaged by the inner end of a locking pin that extends radially from the rear portion of the tumbler. This arrangement permits joint rotation of the key and tumbler. At the same time, the outer end of the locking pin is captured within a segmental cutout in the rear portion of the hollow body of the locking member, thereby establishing the circumferential limits of travel of the tumbler within the hollow body when the key is operated.

BRIEF DESCRIPTION OF THE DRAWING

The invention is further set forth in the following detailed description taken in conjunction with the appended drawing, in which:

FIG. 1 is a perspective view of an outer shell of a gas cap assembly constructed in accordance with the invention, illustrating retaining means for releasably securing a tumbler-type lock and an inner shell therein;

FIG. 2 is a perspective view, in exploded form, of a key-operated, tumbler-type cylindrical lock adapted for association with the outer shell of FIG. 1, the locking member having facilities in accordance with the invention for selectively permitting removal of the gas cap from a gas tank filler tube when the outer shell is manually rotated;

FIG. 3 is a perspective view of an inner shell adapted for cooperation with the arrangement of FIGS. 1–2, such inner shell having an inner periphery contoured in accordance with the invention for cooperation with the coupling facilities of FIG. 2;

DETAILED DESCRIPTION

Figure 1A:
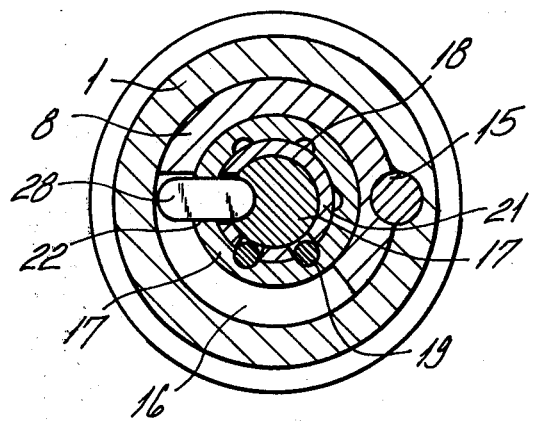
FIG. 1A is a cross-sectional view along line 1A—1A of FIG. 2A.
Figure 1B:
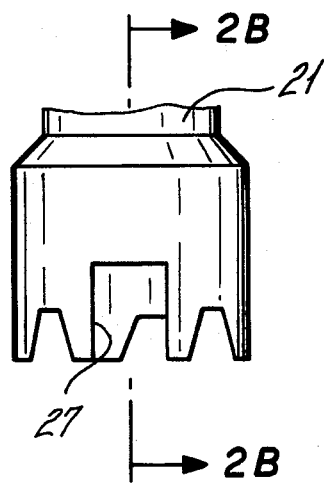
FIG. 1B is a close up view of the key used with the lock of the invention.
Figure 2A:
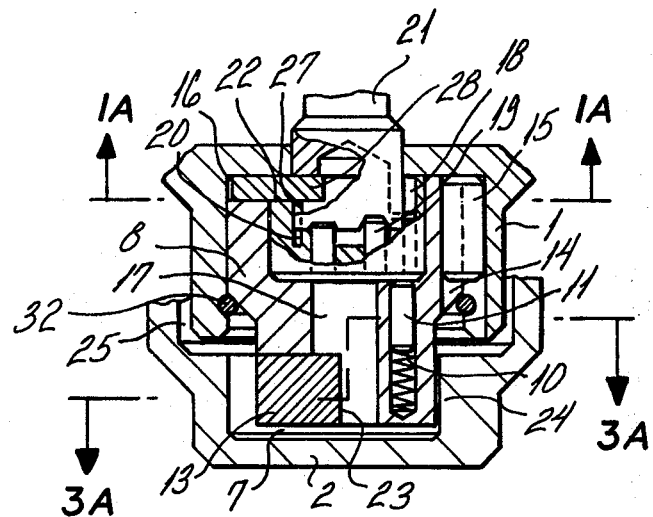
FIG. 2A is a cross-sectional elevational view of the gas cap and lock assembly of the invention.
Figure 2B:
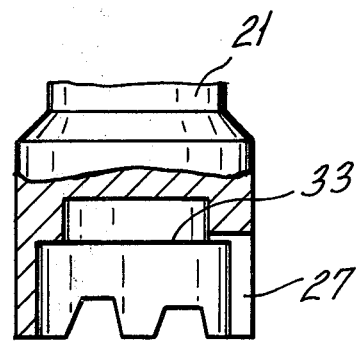
FIG. 2B is an elevational view partially in cross-section of the key used with the lock of the invention.

Referring now to the drawing, FIG. 1 illustrates an outer shell 1 of a composite, lockable gas cap assembly to be described below, such assembly being adapted for removable attachment to the filler tube (not shown) of a vehicle gas tank and the like. Such assembly includes, along with the outer shell 1, the locking assembly identified at 51 in FIG. 2, and an inner shell 2 illustrated in FIGS. 2A and 3.

The outer shell 1 includes a circular apertured portion 30 through which a slotted, front cylindrical portion of a key 21 (FIGS. 2 and 2B) can be inserted, such aperture terminating forwardly in a stepped flange 6 whose inner periphery is adapted to receive a front hollow body 8 (FIG. 2) of the locking assembly 51. The hollow body 8 is releasably secured in the stepped flange 6 by the use of a spring retainer 32.

Figure 3A:
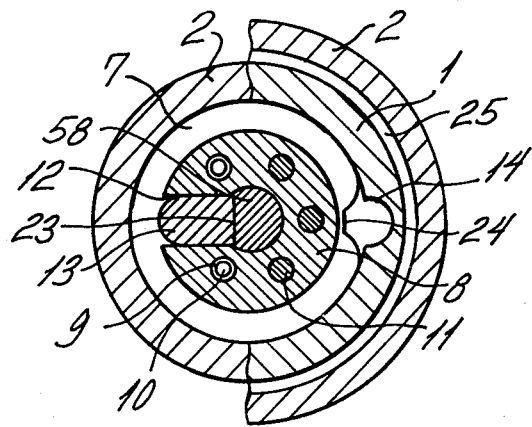
FIG. 3A is a partial cross-sectional view along line 3A—3A of FIG. 2A.
Figure 3B:
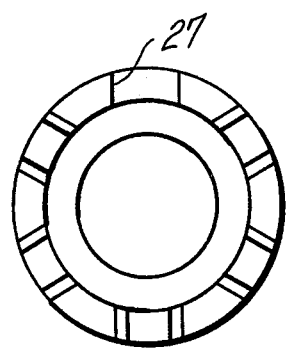
FIG. 3B is a plan view of the key of the lock illustrating the cutouts therein as seen from below in FIG. 1B.

The inner sleeve 2 of FIG. 3 has a front threaded portion 5 adapted for engagement with the above-mentioned filler tube, and has an outer peripheral surface 52 which is receivable within an inner peripheral surface 53 of the outer shell 1 (FIG. 1). The inner shell 2 also has a central aperture 25 therein, such aperture having a contoured front portion 7 described below. A circular rear portion of the aperture 25 is receivable over an outer peripheral surface 54 (FIG. 1) on the forwardly projecting flange 6 of the outer shell 1; in such position, the inner shell 2 is rotatably carried by the outer shell 1 by a spring retainer 3, which permits independent rotation of the inner and outer shells while the key 21 remains unoperated.

The locking member 51 (FIG. 2) includes a rear cylindrical tumbler portion 17, which fits within the hollow body 8. The rear portion of the tumbler 17 has a cylindrical channel portion 20 for receiving projections 56 (of unequal length) on the cylindrical front portion of the key 21, the cylindrical channel 20 intersecting a plurality of axial slots 18 that receive conventional coding pins 19 (of unequal length); the projections 56 are individually associated with the particular slots 18 that carry the coding pins 19 for the particular lock configuration in question.

The locking member assembly 51 further includes a limit pin 28 that projects radially inwardly through the periphery of the rear portion of the tumbler 17, and is seated within a nest 22 in the tumbler 17. In such position, the inner end of the limit pin 28 engages an axial slot 27 cut into the cylindrical front portion of the key 21 when the key is inserted into the tumbler 17, such slot 27 extending rearwardly from the front surface of the key between a pair of adjacent ones of the projections 56. With such arrangement, the limit pin 28 effectively locks the key 21 and the tumbler 17 together for joint rotation.

When the key is thus received within the tumbler 17, the tumbler may be moved, by operation of the key, over a first circumferential distance corresponding to a sector-shaped cutout 16 disposed in the rear portion of the hollow body 8. In order to accomplish this, the outer end of the limit pin 28 is received within the cutout 16, so that the limits of travel of the tumbler 17 when the key is operated correspond to the positions of engagement of the pin 28 with the opposite ends of the cutout 16.

The coding pins 19, received within the slots 18 of the tumbler 17, cooperate with corresponding locking pins 11, which are loaded via individual springs 10 within aligned holes 9 of the hollow body 8. The cooperation of the pins 11, 19, the springs 10, the slots 18 and the holes 9 is conventional in nature, and will not be discussed further here.

In order to provide an additional securing action of the locking member assembly 51 within the outer shell 1 (FIG. 1) while such locking member assembly is held by the retainer 32, the outer periphery of the rear portion of the hollow body 8 may be provided with a arcuate cutout 14A, which receives the periphery of a stop member 15. Such member, in turn, may bear against the periphery of the associated portion of the central aperture 30 in the outer shell 1.

A front portion 57 of the hollow body 8 exhibits a radial slot 12 extending through its wall, such slot 12 serving to expose the periphery of a front projection 58 on the tumbler 17 when the tumbler is inserted into the hollow body 8 the front projection 58 passing through the hole 58A. The radial slot 12, in turn, is radially aligned with the contoured rear portion 7 of the aperture 25 in the inner shell 2 when such inner shell is held within the outer shell 1 by the associated retainer 3. The contour of the portion 7 corresponds to that of an inwardly projecting cusp 24, which has the function indicated below.

The front projection 58 has a recessed portion or flat 23, which is normally exposed through the slot 12 of the hollow body 8 while the key 21 remains unoperated, i.e., while the tumbler 17 is in its fully extended clockwise position with the limit pin 28 resting against an end 59 of the sector-shaped cutout 16. On the other hand, when the key 21 is inserted into the tumbler 17 and is operated, the tumbler 17 is moved in a counter-clockwise direction until the limit pin 28 comes to rest against an opposite end 61 of the cutout 16, in which position an unrecessed portion of the periphery of the front tumbler projection 58 is presented opposite the slot 12.

An elongated follower member 13 is adapted for radial sliding movement in the slot 12 between the periphery of the tumbler projection 58 and the cusped peripheral wall 24 of the inner shell 2. When the follower 13 is in a radial inner position, in the manner to be described, the inner shell 2 rotates freely within the outer shell 1, whereby a manual rotation of such outer shell will have no effect on the threaded connection between the inner shell and the associated gas tank. However, when the follower member 13 is moved into its radially outer position, the cusp 24 will immobilize the follower 13 from further circumferential movement, and will effectively couple the inner and outer shells together for joint rotation. Under such circumstances, a manual rotation of the outer shell 1 in an appropriate direction will cause the inner shell to be unscrewed from the gas tank filler tube.

In use, the operation of the key 21 will rotate the tumbler 17 in a counterclockwise direction, so that the movement of the unrecessed portion of the tumbler periphery 58 will serve to cam the follower member 13 outwardly through the slot and into engagement with one of the side walls of the cusp 24 (FIG. 3), whereby the resulting coupling of the inner and outer shells 1 and 2 will permit removal of the gas cap assembly from the gas tank.

In order to re-lock the gas cap after replacement thereon on the filler tube (in which case a front flat washer 29 illustratively bears against the filler tube), the key 21 is moved fully clockwise, thereby again presenting the recessed portion 23 of the periphery 58 of the tumbler 17 in registration with the radial slot 12. This action removes the radial outward urging force on the follower member 13, so that upon a manual rotation of the outer shell 1 the cusp 24 on the peripheral wall of the surrounding inner shell 2 will serve to cam the follower 13 in an inward direction and into engagement with the recess 23 of the tumbler 17. When this occurs, the inner shell 2 is no longer coupled to the outer shell 1, so that manual rotation of the outer shell will no longer be effective to unscrew the gas cap assembly.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In a lockable gas cap assembly, an outer hollow shell having a first circular central aperture; an inner hollow shell having a second inwardly cusped central aperture and adapted for attachment to a filler tube for a gas tank; cylindrical locking means comprising a front hollow body having adjacent front and rear portions, the front portion of the hollow body having a radial slot extending through the wall thereof, and a rear, key-operated cylindrical tumbler receivable within the hollow body for angular rotation with respect thereto through a predetermined first circumferential distance, the tumbler having a forwardly extending first projection aligned with and disposed within the slotted front portion of the hollow body and having a peripheral recess normally in registration with the radial slot in the hollow body, the tumbler being rotatable, when the key is operated, to present the unrecessed portion of the periphery of the first projection opposite the radial slot;

first retaining means removably carrying the inner shell for coaxial rotation within the outer shell; second retaining means for removably securing the locking means within the first aperture of the outer sleeve, the inwardly cusped peripheral wall of the second aperture of the inner shell surrounding the slotted forward portion of the hollow body of the locking means when the locking means and inner shell are retained within the outer shell; and an elongated follower member adapted for radial sliding movement in the radial slot in the hollow body between the periphery of the underlying first projection of the tumbler and the overlying cusped peripheral wall of the inner shell, whereby when the key is operated the unrecessed portion of the projection of the tumbler urges the follower member against the surrounding peripheral wall of the inner shell to be restrained against rotation by the cusp.

2. An assembly as defined in claim 1, in which the rear portion of the hollow body has a sector-shaped cutout extending over the first circumferential distance, and in which the assembly further comprises a limit pin extending radially outwardly from the outer periphery of a rear portion of the tumbler and having an outer end captured within the cutout.

3. An assembly as defined in claim 2, in which the key comprises, in combination, a plurality of forwardly extending second projections; and in which the rear portion of the tumbler has an axially forwardly extending channel for receiving the second projections of the key.

4. An assembly as defined in claim 3, in which the key further comprises means defining an axial slot extending rearwardly between a pair of adjacent second projections; in which the rear portion of the tumbler further comprises means defining an opening extending radially inwardly from a peripheral surface thereof in alignment with the axial slot in the key when the key is inserted into the tumbler; and in which the inner end of the limit pin extends through the opening in the rear portion of the tumbler to engage the axial slot in the key when the key is inserted into the tumbler to permit joint rotation of the key and tumbler as a unit through the first circumferential distance.

* * * * *